(12) United States Patent
Chiang et al.

(10) Patent No.: US 8,402,470 B2
(45) Date of Patent: *Mar. 19, 2013

(54) PROCESSOR THREAD LOAD BALANCING MANAGER

(75) Inventors: Men-Chow Chiang, Austin, TX (US); Hong Lam Hua, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/452,849

(22) Filed: Apr. 21, 2012

(65) Prior Publication Data

US 2012/0204188 A1 Aug. 9, 2012

Related U.S. Application Data

(63) Continuation of application No. 12/880,534, filed on Sep. 13, 2010.

(51) Int. Cl.
 *G06F 9/46* (2006.01)
(52) U.S. Cl. .......................... 718/104; 718/105
(58) Field of Classification Search .................. None
 See application file for complete search history.

(56) References Cited

U.S. PATENT DOCUMENTS

| | | | |
|---|---|---|---|
| 5,745,778 A * | 4/1998 | Alfieri | 712/1 |
| 6,993,767 B2 | 1/2006 | Brenner | |
| 7,080,379 B2 | 7/2006 | Brenner | |
| 7,398,521 B2 * | 7/2008 | Hoflehner et al. | 717/151 |
| 7,565,653 B2 | 7/2009 | Inoue | |
| 7,614,056 B1 | 11/2009 | Saxe | |
| 7,624,257 B2 | 11/2009 | Kra | |
| 8,171,267 B2 | 5/2012 | Lee | |
| 2006/0037017 A1 * | 2/2006 | Accapadi et al. | 718/100 |
| 2006/0123423 A1 * | 6/2006 | Brenner | 718/105 |
| 2008/0040583 A1 | 2/2008 | Kra | |

OTHER PUBLICATIONS

Malik—"Dynamic Load Balancing in a Network of Workstations", Networking Technologies 95.515F Research Report, (Nov. 29, 2000).

Williams—"Performance of Dynamic Load Balancing Algorithms for Unstructured Mesh Calculations", California Institute of Technology Pasadena, California C3P 913 (Jun. 1990).

* cited by examiner

*Primary Examiner* — Camquy Truong

(74) *Attorney, Agent, or Firm* — David Mims; Mark P Kahler (57) ABSTRACT

A processor thread load balancing manager employs an operating system of an information handling system (IHS) that determines a process tree of data sharing threads in an application that the IHS executes. The load balancing manager assigns a home processor to each thread of the executing application process tree and dispatches the process tree to the home processor. The load balancing manager determines whether a particular poaching processor of a virtual or real processor group is available to execute threads of the executing application within the home processor of a processor group. If ready or run queues of a prospective poaching processor are empty, the load balancing manager may move or poach a thread or threads from the home processor ready queue to the ready queue of the prospective poaching processor. The poaching processor executes the poached threads to provide load balancing to the information handling system (IHS).

6 Claims, 4 Drawing Sheets

FIG. 2
THREAD FLOW PATH

FIG. 3A

PROCESSOR LOAD BALANCING METHOD AND TOOL

DETAILED DESCRIPTION

PROCESSOR THREAD LOAD BALANCING MANAGER

This patent application is a continuation of, and claims priority to, the U.S. patent application entitled "Processor Thread Load Balancing Manager", inventors Chiang, et al., application Ser. No. 12/880,534, filed Sep. 13, 2010, that is assigned to the same Assignee as the subject patent application, the disclosure of which is incorporated herein by reference in its entirety.

BACKGROUND

The disclosures herein relate generally to information handling systems (IHSs), and more specifically, to management of process thread load balancing in an IHS.

Information handling systems (IHSs) typically employ operating systems that execute applications or other processes that may require the resources of multiple processors or processor cores. IHS operating systems may group processes or threads of an application into process trees. Operating systems may group threads into process trees that exhibit or employ data sharing. In other words, operating systems may group those threads of an application that share data into process trees prior to thread execution. Load balancing may include moving threads from one processor to another processor in the IHS during execution in order to achieve better balancing of IHS resources.

BRIEF SUMMARY

In one embodiment, a method of load balancing in an information handling system (IHS) is disclosed. The method includes determining, by an operating system in the IHS, a process tree including a plurality of threads that share data, the IHS including a home processor element. The method also includes assigning, by a load balancing manager, a respective home processor element identifier (HPEI) to each thread of the plurality of threads. The method further includes commencing, by the home processor element, execution of the plurality of threads of the process tree. The method still further includes identifying, by the load balancing manager, a poaching processor element with an available ready queue. The method also includes moving, by load balancing manager, one or more threads of the process tree from the home processor element to the available ready queue of the poaching processor element. The method further includes executing, by the poaching processor element, the one or more threads of the process tree. In one embodiment, the load balancing manager determines that a ready queue of a prospective poaching processor element is empty of threads to indicate that the ready queue is an available ready queue. Alternatively, the load balancing manager may determine that both a ready queue and a run queue of a prospective poaching processor element are empty of threads to indicate that the prospective poaching processor element is available.

BRIEF DESCRIPTION OF THE DRAWINGS

The appended drawings illustrate only exemplary embodiments of the invention and therefore do not limit its scope because the inventive concepts lend themselves to other equally effective embodiments.

Information handling systems (IHSs) typically employ operating systems that execute applications or other processes within the IHS. The IHS may include multiple processors, such as processor cores, or other processor elements for application execution and other tasks. A particular processor may communicate with local memory stores, such as L1 cache, L2 cache, or other local memory. The particular processor may also communicate with remote memory stores, such as main memory, hard drives, and across network resources to remote computers or servers, or other remote memory. During execution of an application, such as a Java application or other application, the particular processor or multiple processors may execute individual threads of the application. During the application execution, the particular processor or multiple processors may access both local and remote memory stores.

Threads that share data may also share memory resources, such as the processor's local memory that include working data sets. High speed local cache or local memory of a processor may reduce the amount of resources or overhead that processors exhibit during thread processing by including these working data sets or thread data close to the executing processor. However when load balancing methods move threads from one processor to a second processor, substantial system overhead may occur when this second processor requires access to the working data set. An IHS may benefit from efficient use of local cache and other local memory resources when possible. IHSs may exhibit more efficiency when load balancing operations minimize the impact of local versus remote memory access during thread execution as well as efficient balancing of multiple processor resources.

It is important when maintaining an efficient IHS operation to minimize the amount of access to remote memory stores due to the high overhead or bandwidth requirements of these memory operations. Local memory stores provide an efficient source of memory store capability during application execution. However, in a multiple processor system, such as an IHS with a group of processors, multiple processors that share application thread execution may slow a system down. For example, multiple processors that share application thread execution may exhibit multiple read and write operations to data in memory that a particular group of threads share. Load balancing managers of the IHS may group threads that share data into data sharing threads known as process trees. A particular process tree is a group of threads that belong to a particular application and exhibit data sharing attributes among them.

A load balancing manager may reduce memory access by reducing the number of processors that data sharing threads or process trees execute. A load balancing manager may bind or restrict a particular process tree to one processor of the processors of the IHS. In this manner, the one processor designated as the "home processor" of the process tree, uses only local memory stores that correspond to this home processor. Other processors of the IHS do not execute the process tree and therefore do not require access to the local memory stores of the home processor. Although the binding process improves memory read and write access times, it may result in a poor use of multiple processor processing capability. It is possible for whole processors to be idle and available for execution processing and yet receive no access to process tree threads due to binding restrictions.

In one embodiment of the disclosed load balancing methodology, a load balancing manager may allow idle processors to share thread execution with the home processor. The load balancing manager may in this manner balance the trade-offs between memory sharing and processor execution performance. A load balancing manager may provide thread dispatch within an IHS to processors in such a manner that such dispatch and subsequent execution maintains the same benefits as processor binding when the performance opportunity exists. In one embodiment, the load balancing manager may perform without initial user interaction and function without need for user intervention during application processing. The load balancing manager may be part of the operating system in one embodiment.

After an operating system determines a process tree of data sharing threads from a particular application, the operating system assigns each thread of that process tree to a home processor. The operating system and/or load balancing manager may designate a particular processor as the home processor by assigning the particular processor a home processor element identifier (HPEI). The operating system and/or load balancing manager may assign the same HPEI, and thereby the same home processor to each thread of the process tree of data sharing threads. In this manner, at any point during process tree thread execution, the load balancing manager may determine the primary or home processor where that process tree resides. The home processor may provide the local memory that best reflects the efficient use of IHS resources during application execution. However, when a processor of the IHS is idle, that processor may become the "poaching processor" and poach, take, or otherwise move one or more threads from the home processor's resources to the poaching processor's resources for execution. Poaching refers to an idle or available processor poaching or taking a thread or threads from the home processor for load balancing. In this manner, the poaching processor may assist with the execution of one or more threads of the process tree whenever by providing additional capability or throughput to the total application execution performance. The load balancing manager uses the poaching processor to effectively unbind a particular thread or threads from the home processor element to which the load balancer assigned the process tree including that thread or threads.

If the poaching processor does not provide an improvement in overall performance, the load balancing manager may reject or otherwise not allow poaching from that processor. The load balancing manager may facilitate the location of the poaching processor in close proximity to the home processor, such as on the same die, chip, or integrated circuit (IC) in the case of processor cores, to minimize distance for memory access and other communications. The load balancing manager, as well as other resources of the IHS may generate virtual representations of the IHS elements that include ready and run queues and other elements. In other words, the processors, processor cores, or processor elements, ready queues, run queues as well as other elements may be virtual representations of the IHS.

Figure 1:
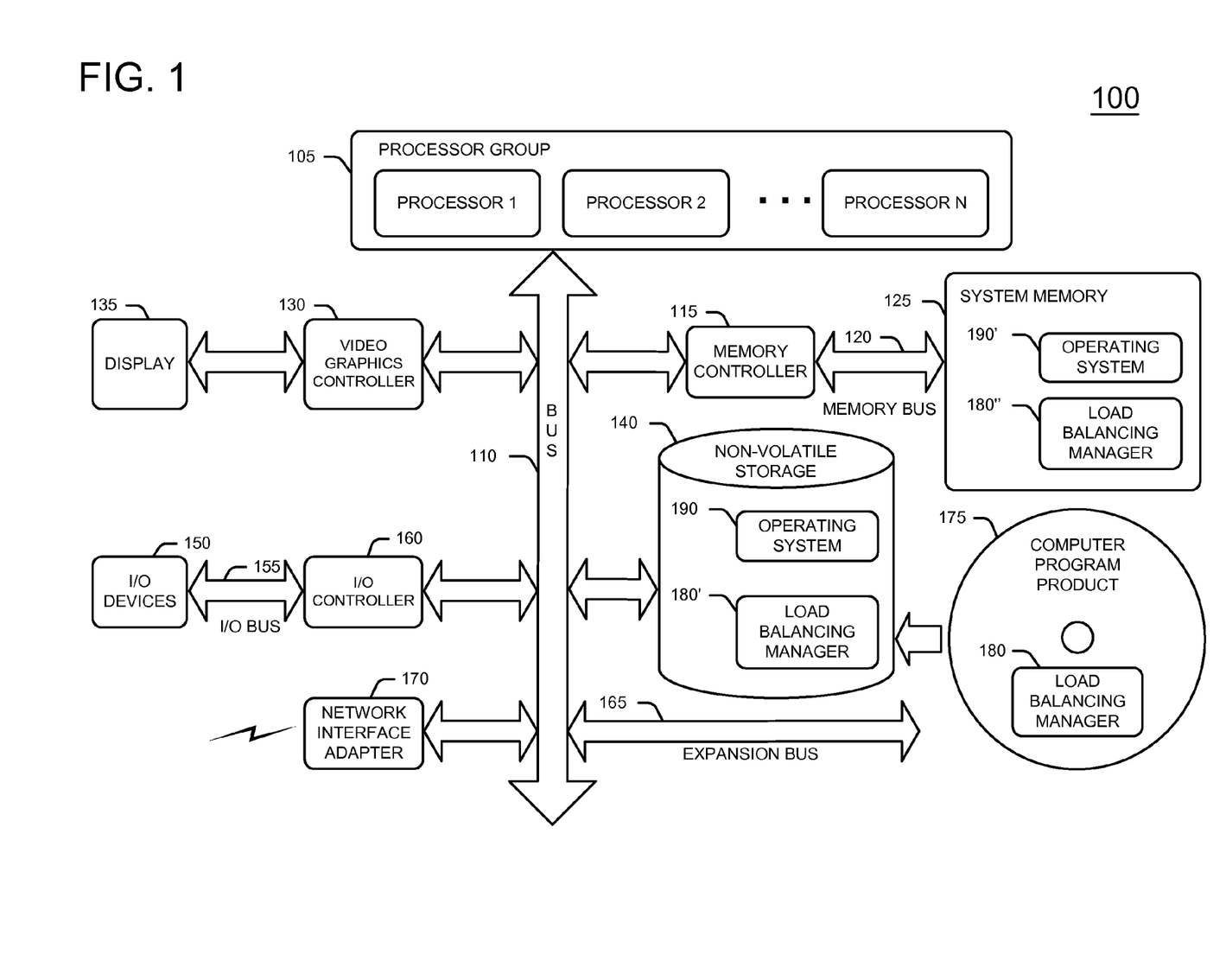
FIG. 1 shows a block diagram of a representative information handling system (IHS) that employs the disclosed load balancing methodology.

FIG. 1 shows an information handling system 100 with a load balancing manager 180 that employs the disclosed load balancing methodology. IHS 100 includes a processor group 105 that includes multiple processors, namely processor 1, processor 2, . . . processor N, wherein N is the total number of processors in processor group 105. Processor group 105 may include multiple processors, processor cores or other processor elements. In one embodiment, a processor element may include multiple processor cores. IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array. Processor 105 may also include local memory (not shown) such as L1 and L2 caches (not shown). A video graphics controller 130 couples display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system. IHS 100 may take other form factors such as a gaming device, a personal digital assistant (PDA), a portable telephone device, a communication device or other devices that include a processor and memory.

IHS 100 employs an operating system (OS) 190 that may store information on nonvolatile storage 145. IHS 100 includes a computer program product on digital media 175 such as a CD, DVD or other media. In one embodiment, a designer or other entity configures the computer program product with load balancing manager 180 software to practice the load balancing methodology. In practice, IHS 100 may store load balancing manager 180 and OS 190 on nonvolatile storage 145 as load balancing manager 180' and OS 190. When IHS 100 initializes, the IHS loads load balancing manager 180' and OS 190 into system memory 125 for execution as load balancing manager 180" and OS 190', respectively.

As will be appreciated by one skilled in the art, aspects of the disclosed load balancing methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 175 embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 3A and FIG. 3B flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 3A and FIG. 3B and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 3A:
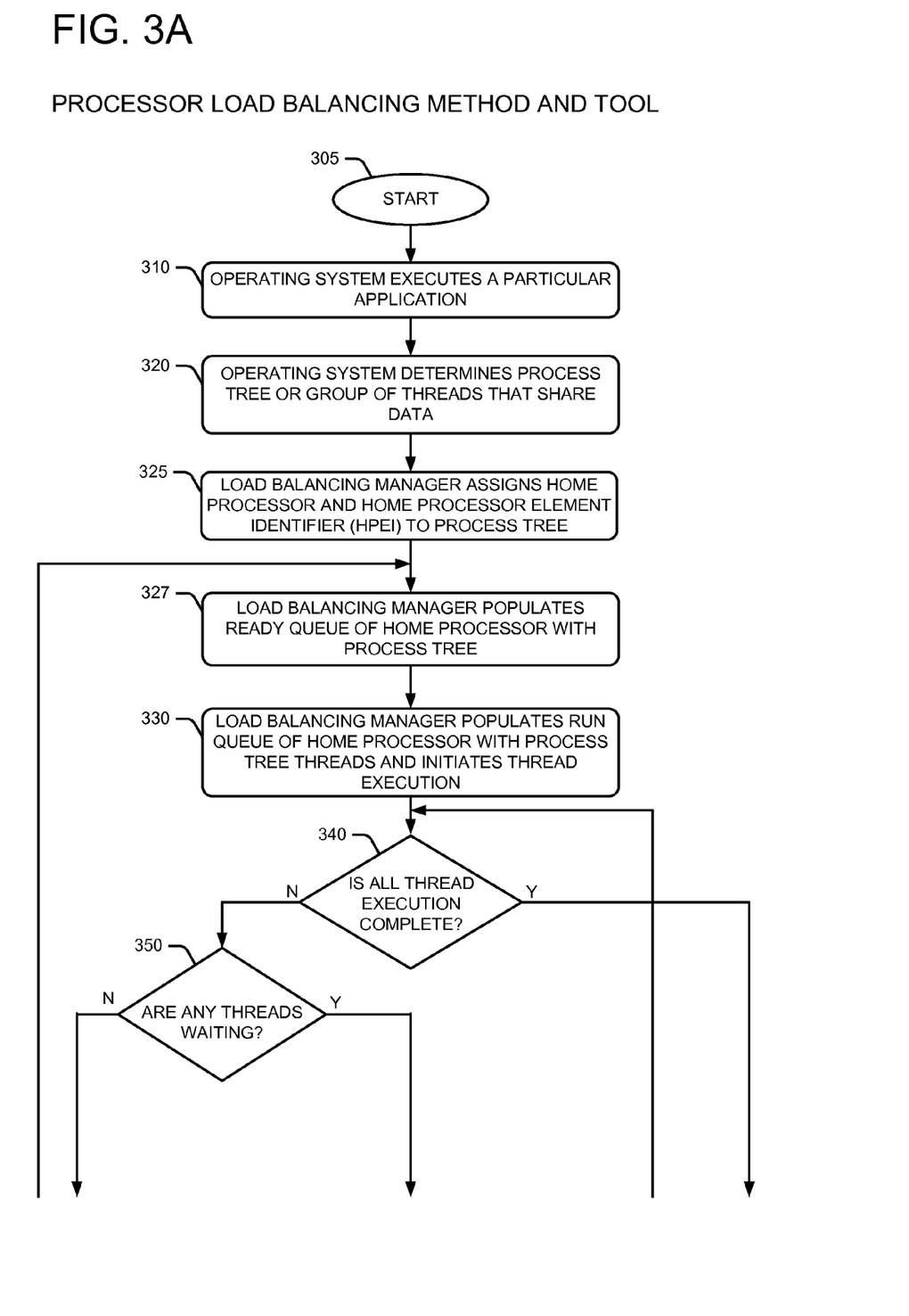
FIG. 3A and FIG. 3B depict a flowchart of an embodiment of the disclosed load balancing method that provides IHS processor thread balancing capability.
Figure 3B:
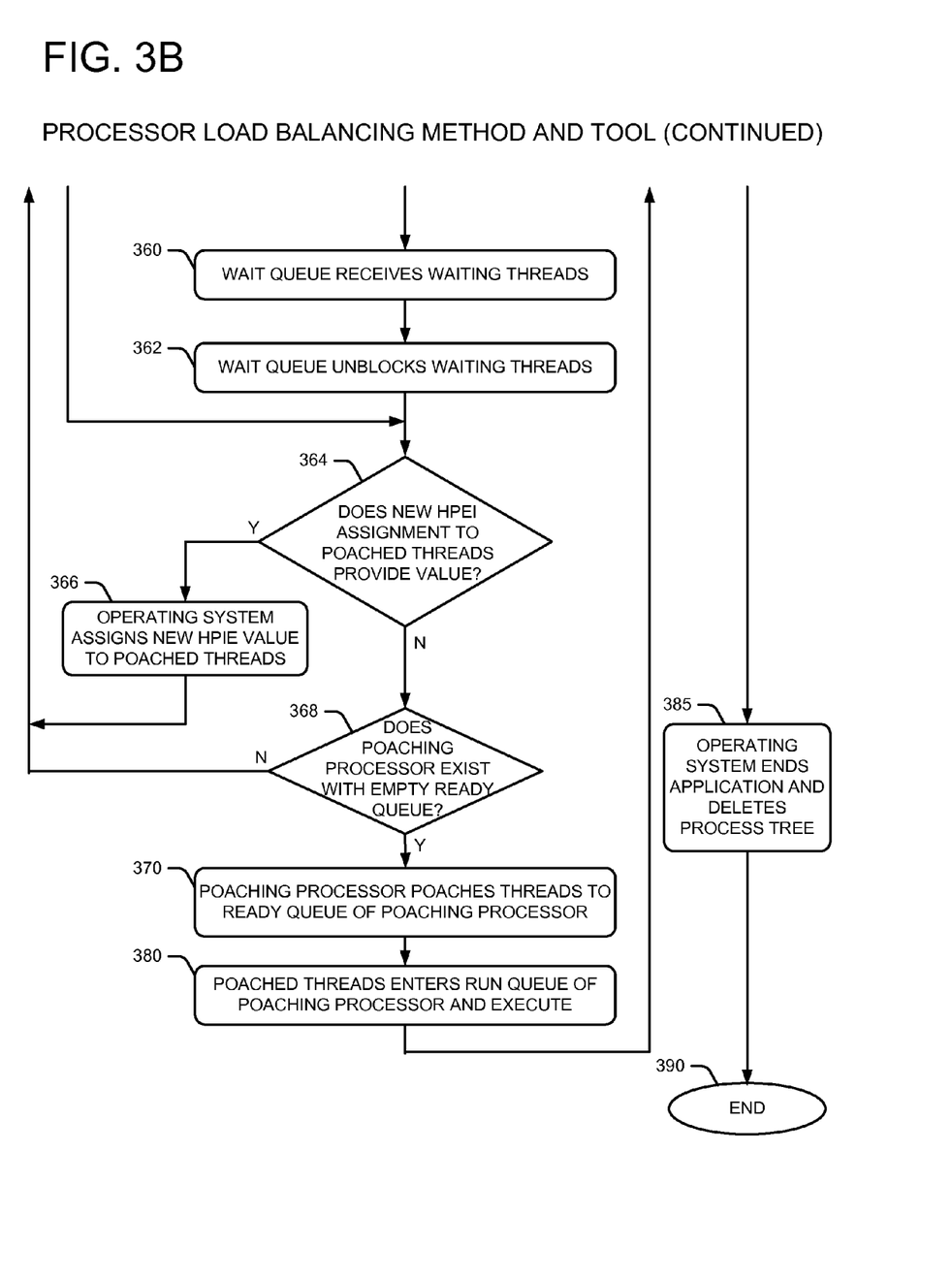

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 3A and FIG. 3B as described below.

Figure 2:
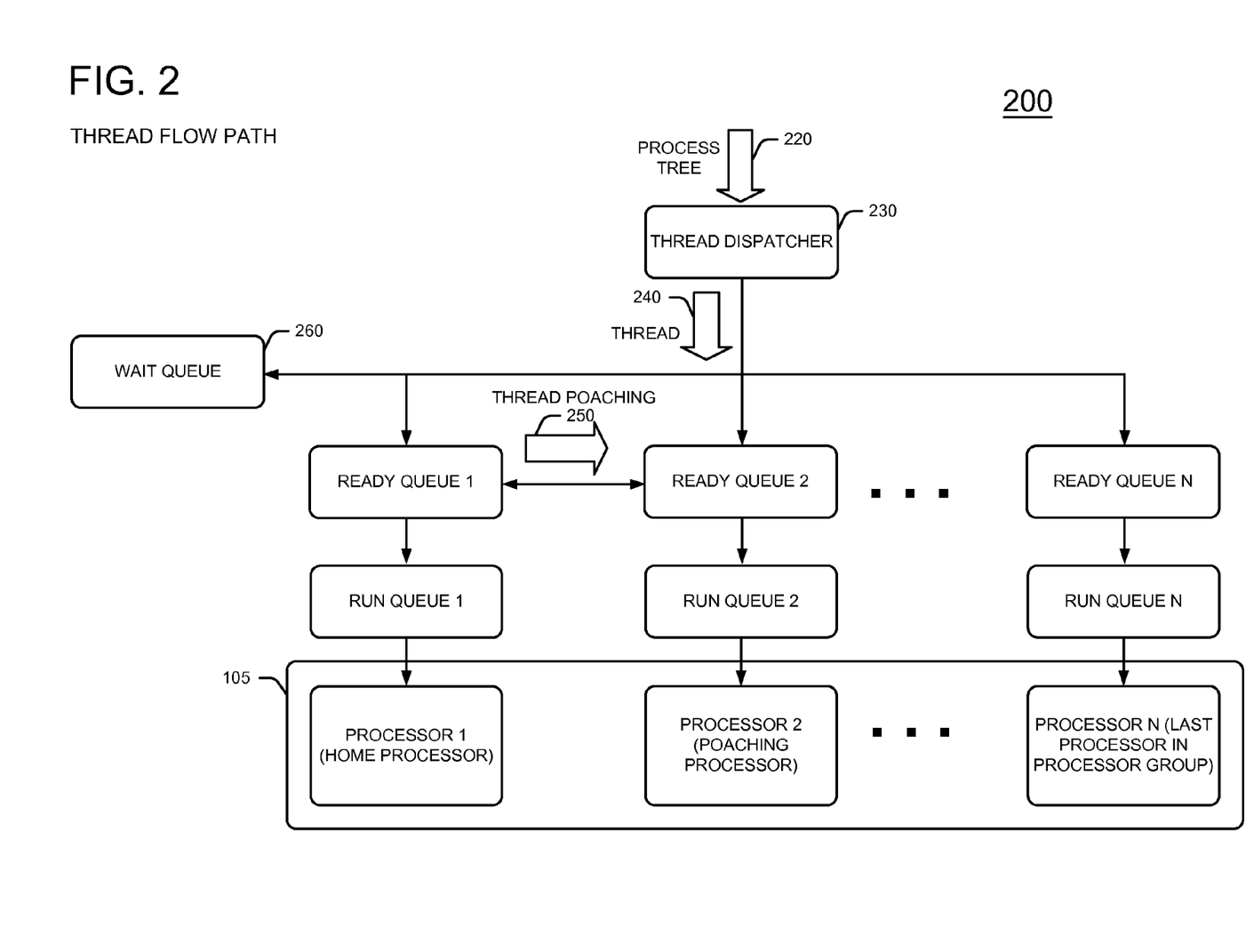
FIG. 2 shows thread flow path within an IHS that employs the disclosed load balancing methodology.

FIG. 2 is a block diagram of a representative process thread flow path 200 that load balancing manager 180 software configures according to the disclosed load balancing manager methodology. Operating system OS 190 may process threads as units of a particular application. For example, OS 190 may interpret a Java application and generate process threads such as Java threads prior to application thread execution. Threads or application processes may flow through processor hardware or virtual processor elements during scheduling, execution, and other operations.

Thread flow path 200 may exist in a physical environment or as a virtual environment, such as an emulation of a physical processor thread flow path within IHS 100. In one embodiment of the disclosed load balancing method, processor 1, processor 2, . . . processor N exist as virtual representations of physical processors, processor cores, or other processor elements. N is the total number of processors in process group 105. When a particular application or program executes within IHS 100, operating system software as well as other software (not shown) may generate one or more process trees, such as a process tree 220 from the particular application prior to application execution. Process tree 220 provides thread information to a thread dispatcher 230 as shown in FIG. 2 by the pointing arrow of process tree 220.

Process tree 220 may be a grouping of threads that share data. OS 190 may group threads in this manner to facilitate efficient execution for each process tree. For example, grouping threads that share data into a process tree that may execute within one particular processor may achieve a reduction in memory access operations. One particular processor may use only cache memory as a local memory resource. However multiple processors that execute a process tree with data sharing threads may require access to each other's local cache. In some circumstances, sharing of threads requires a large amount of memory overlap and may result in long thread execution times.

Thread dispatcher 230 dispatches threads of a particular process tree. Thread 240 is an example of one such dispatched thread as indicated by the pointing arrow of thread 240. Thread dispatcher 230 couples to and dispatches threads of a particular process tree to a ready queue 1, a ready queue 2, . . . ready queue N, wherein N is the total number of processors in process group 105. In one embodiment of the disclosed load balancing method, if IHS 100 does not include ready and run queues, the load balancing manager 180 and other resources may create those resources in a virtual environment. In this manner, load balancing manager 180 may implement the disclosed load balancing method using virtual resources as well as physical resources of IHS 100. Ready queue 1 couples to ready queue 2 and depicts a thread 250 being poached, as indicated by the pointing arrow of poached thread 250 and described in more detail below.

Ready queue 1 couples to a run queue 1 and enables one type of thread flow operation from ready queue 1 to run queue 1. OS 190 may move thread 240 from thread dispatcher 230 to ready queue 1 during dispatch of that thread and other threads (not shown). OS 190 may subsequently move thread 240 to run queue 1 during normal operations of IHS 100 and particularly during dispatch and execution of process tree 220. Ready queue 2 couples to a run queue 2 and enables one type of thread flow operation from ready queue 2 to run queue 2. Ready queue N couples to a run queue N and enables one type of thread flow operation from ready queue N to run queue N. N is the total number of processors in processor group 105.

Run queue 1 couples to processor 1 within processor group 105 and provides flow of process tree threads to processor 1 for execution or other operations. In one embodiment of the disclosed load balancing method, an execution unit (not shown) may couple to run queue 1 of thread flow path 200 to execute the threads of processor 1. Run queue 2 couples to processor 2 within processor group 105 and provides flow of process tree threads to processor 2 for execution or other operations. In one embodiment of the disclosed load balancing method, an execution unit (not shown) may couple to run queue 2 of thread flow path 200 to execute the threads of processor 2. Run queue N couples to processor N within processor group 105 and provides flow of process tree threads to processor N for execution or other operations. In one embodiment of the disclosed load balancing method, an execution unit (not shown) may couple to run queue N to execute the threads of processor N. N is the total number of processors in processor group 105.

Processor 1, processor 2, . . . processor N may represent physical processors, processor cores, or processor elements within IHS 100, and more specifically within processor group 105. In one embodiment of the disclosed load balancing method, processor 1, processor 2, . . . processor N are virtual representations of physical processors, processor cores, or other processor elements. Processor 1 may represent the home processor and processor 2 may represent the poaching processor. Each processor of processor group 105 may be within the same processor integrated circuit IC or in a different IC of the same or different IHS. Processors of processor group 105 may exist in different locations such as different servers, computers, or other processing entities.

In one embodiment of the disclosed load balancing method, a wait queue 260 couples to thread dispatcher 230 and each ready queue, namely ready queue 1, ready queue 2, . . . ready queue N, wherein N is the total number of processors of process group 105. Wait queue 260 may provide a queue for temporary storage of threads, such as thread 240. Threads within wait queue 260 may wait or hold for execution within IHS 100. OS 190 may determine that a particular thread is not ready for execution due to a particular wait or busy event and may move that thread, such as thread 240, temporarily to wait queue 260. OS 190 may determine later that a particular wait or busy condition clears and that thread 240 is ready for execution. OS 190 may then move thread 240 back to a particular ready queue, such as ready queue 1, following the wait or busy event. In one embodiment of the disclosed load balancing method, OS 190 may implement wait queue 260 as a virtual representation of a physical queue entity. Although thread flow path 200 demonstrates one example of thread flow, other embodiments may be possible in both virtual and physical states to supply application thread management resources to processors of processor group 105.

The flowchart of FIG. 3A and FIG. 3B illustrates the architecture, functionality, and operation of possible implementations of systems, methods and computer program products that perform data packet management in accordance with various embodiments of the present invention. In this regard, each block in the flowchart of FIG. 3A and FIG. 3B may represent a module, segment, or portion of code, which comprises one or more executable instructions for implementing the specified logical function(s). It should also be noted that, in some alternative implementations, the functions noted in the block may occur out of the order noted in FIG. 3A and FIG. 3B. For example, two blocks shown in succession may, in fact, be executed substantially concurrently, or the blocks may sometimes be executed in the reverse order, depending upon the functionality involved. It will also be noted that each block of FIG. 3A and FIG. 3B and combinations of blocks in the block diagrams and/or flowchart illustration, can be implemented by special purpose hardware-based systems that perform the specified functions or acts, or combinations of special purpose hardware and computer instructions.

FIG. 3A and FIG. 3B show a flowchart that shows process flow in an embodiment of the disclosed load balancing methodology that provides thread level load balancing in an IHS.

More specifically, the flowchart of FIG. 3A and FIG. 3B shows how load balancing manager 180 provides the movement of thread execution of one particular process tree between multiple processors of processor group 105. Thread movement may provide more efficient utilization of IHS 100 resources during execution of a particular application. The disclosed load balancing method starts, as per block 305. In one embodiment, operating system OS 190 executes a particular application as per block 310. For example, OS 190 may execute a particular Java application within IHS 100.

OS 190 determines a particular process tree or group of threads that share data, as per block 320. For example, OS 190 may interpret the threads of a particular Java application and group those threads into process tree groups. One process tree, such as process tree 220 may represent threads that share particular data or a particular data group such as a working data set. In this manner, OS 190 may represent a particular Java application as one or more process trees. In one embodiment of the disclosed load balancing methodology, OS 190 generates a process tree, namely process tree 220.

Load balancing manager 180 assigns a home processor or home processor element to process tree 220 by assigning a home processor element identifier (HPEI) to process tree 220, as per block 325. In other words, each thread, such as thread 240 of process tree 220, corresponds to a particular HPEI, such as the HPEI for processor 1. In this manner, processor 1 is the "home processor" of a process tree 220 that includes multiple threads, such as thread 240. In one embodiment of the disclosed load balancing method, OS 190 may assign the HPEI to the thread data structure within the context block of a thread and all descendants of that thread to form a process tree, such as process tree 220.

Load balancing manager 180 populates the ready queue of the home processor with process tree threads, as per block 327. Load balancing manager 180 populates the run queue of the home processor with process tree threads and initiates or starts thread execution of those threads, as per block 330. For example, load balancing manager 180 dispatches with thread dispatcher 230 each thread in process order within process tree 220 to ready queue 1 and then to run queue 1 that corresponds to processor 1. Once the threads are within run queue 1, processor 1 may initiate the execution of those threads using execution units (not shown) or other IHS 100 resources. In one embodiment of the disclosed load balancing method, load balancing manager 180 tests to determine if all thread execution of the process tree 220 threads is complete, as per block 340.

If all thread execution is not complete, load balancing manager 180 tests to determine if any threads are waiting, as per block 350. For example, OS 190 may move threads, such as thread 240 from ready queue 1 to wait queue 260. If any threads are waiting, wait queue 260 receives waiting threads, as per block 360. For example, wait queue 260 may move thread 240 to ready queue 1 for further analysis. Wait queue 260 unblocks waiting threads, as per block 362. Wait queue 260 may hold thread 240 or other threads until a particular hardware or software event occurs or other unblocking action causes OS 190 to move waiting threads into a particular queue, such as ready queue 1, as shown in thread flow path 200. In one embodiment of the disclosed load balancing methodology, when OS 190 unblocks a particular waiting thread, OS 190 moves the waiting thread to the ready queue of the originating home processor of the waiting thread. If no threads are waiting, or if processing is complete by wait queue 260, OS 190 performs a test to determine if a new HPIE assignment to poached threads provides value, i.e. provides a performance advantage, as per block 364. In other words, OS 190 determines if there is a benefit or performance advantage in re-assigning the HPIE of the process tree poached threads to better distribute of the threads of process tree 220. In that case, OS 190 reassigns the process tree 220 poached threads to a new HPIE, as per block 366.

Load balancing manager 180 tests to determine if a prospective "poaching processor" exists with an empty ready queue, as per block 368. In other words, if a prospective poaching processor exists with an empty queue, then that prospective poaching processor is available for poaching one or more threads from a the home processor. If a poaching processor does not exist with an empty queue, then load balancing manager 180 populates ready queue 1 of the home processor with the process tree threads again, as per block 327 and flow continues. A poaching processor, or poaching processor element such as processor 2 is a "non-home processor" (non processor 1) that has available resources to assist in thread execution of process tree 220 threads. In one embodiment of the disclosed load balancing method, load balancing manager 180 determines that the poaching processor, namely processor 2, has available resources by determining that processor 2 has an empty ready queue, namely ready queue 2. In other embodiments of the disclosed load balancing method, load balancing manager 180 may determine that poaching processor 2 has available resources or bandwidth to support thread execution by determining that both ready queue 2 and run queue 2 are empty. Load balancing manager 180 may determine the availability of processor 2 resources by analysis of other determining states of processor 2 and corresponding queue resources. In one embodiment of the disclosed load balancing method, IHS 100 may not use a wait queue, such as wait queue 260. In this case, thread dispatcher 230 moves threads, such as thread 240 directly from each corresponding ready queue, such as ready queue 1 to run queue 1 without waiting.

If load balancing manager 180 determines that a poaching processor, such as processor 2, exists with an empty ready queue, such as ready queue 2, the poaching processor poaches threads to the ready queue of the poaching processor, as per block 370. In other words, if load balancing manager 180 determines that ready queue 2 is empty, poaching processor 2 may poach or otherwise take one or more threads, such as thread 240 and other threads of process tree 220 from run queue 1 of processor 1, the home processor. Load balancing manager 180 poaches or moves the poached thread or threads to the ready queue of the poaching processor, namely processor 2. As shown in thread flow path 200, threads move from ready queue 2 of the poaching processor to run queue 2 of the poaching processor, namely processor 2.

The poached thread or threads enter the run queue of the poaching processor and execute, as per block 380. In this manner, processor 1 (the home processor) is relieved of the overhead of executing thread 240 and processor 2 (the poaching processor) takes on the responsibility of thread 240 execution. Load balancing manager 180 may poach one or more threads from the home processor. Load balancing manager 180 may determine the best number of threads to poach by analysis of multiple conditions. For example, load balancing manager 180 may take into account the overhead that poaching requires, the ready queue 1 length in terms of thread count, the total number of idle processors in processor group 105 that are available, as well as other conditions or factors.

This process demonstrates load balancing by thread movement and execution in more than one processor of processor group 105 of IHS 100. In one embodiment of the disclosed load balancing method, multiple poaching processors may poach from a particular home processor in parallel. In other words, multiple poaching processors may poach from a particularly long ready queue 1 in terms of thread count to reduce the home processor load at the same time by implementation of parallel resources. Parallel resources may include parallel access by poaching processors to ready queue 1 or run queue 1 of the home processor.

Load balancing manager 180 continues testing if all thread execution is complete again, as per block 340, and once all execution is complete, OS 190 ends the particular application and deletes process tree 220, as per block 385. The disclosed load balancing methodology ends, as per block 390. In one embodiment of the disclosed load balancing method, the poaching processor, such as processor 2, may not complete total execution of the poached thread, such as thread 240. The poaching processor may perform partial execution of thread 240 and the load balancing manager 180 may then return thread 240 to run queue 1 of the home processor, namely processor 1 for execution completion. Load balancing manager 180 may achieve performance improvement by varying the amount of execution time that the poaching processor holds thread 240 or other threads for execution. In other words, the poaching processor or poaching processor element may poach one or more threads for a predetermined amount of time. After the predetermined amount of time lapses, the poaching processor may return the poached thread or threads to the home processor or home processor element.

In one embodiment of the disclosed load balancing methodology, after the load balancing manager 180 assigns an HPEI to the threads of a particular process tree, initially all of the threads of that process tree are assigned to the ready queue of their respective home processor. Subsequent to entry into the ready queue of the home processor, the threads enter the run queue of the home processor to execute. When the threads finish execution by either the home processor or the poaching process, but are not yet completed, the threads enter the ready queue of the home processor unless they are poached again.

In another embodiment of the disclosed load balancing methodology, the load balancing manager 180 may consider the locality of both the home processor and the poaching processor when determining poaching opportunities. For example, the load balancing manager 180 may consider the home processor and poaching processors that reside on the same IC or chip as a higher priority than that of a home processor and poaching processor that reside further physically or electrically apart from each other. By reducing distance between the home processor and the poaching processor, load balancing operations may exhibit better throughput due to communication bandwidth considerations between processors and their respective memories.

As will be appreciated by one skilled in the art, aspects of the disclosed load balancing management technology may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of load balancing in an information handling system (IHS), comprising:
   determining, by an operating system in the IHS, a process tree including a plurality of threads that share data, the IHS including a home processor element and multiple poaching processor elements, the home processor element being associated with a respective ready queue and a respective run queue, each of the multiple poaching elements being associated with respective ready queues and respective run queues;
   assigning, by a load balancing manager, a same home processor element identifier (HPEI) to each thread of the plurality of threads of the process tree;
   commencing, by the home processor element, execution of the plurality of threads of the process tree;
   identifying, by the load balancing manager, multiple poaching processor elements with both respective available ready queues and respective available run queues;
   moving in parallel, by the load balancing manager, multiple threads of the plurality of threads of the process tree from the ready queue and run queue of the home processor element to the available ready queues and run queues of the multiple poaching processor elements; and
   executing, by the multiple poaching processor element, the multiple threads of the plurality of threads of the process tree;
   returning, after partial execution by the multiple poaching processor elements, the multiple threads of the plurality of threads to the home processor element after a predetermined amount of time.

2. The method of claim 1, wherein the load balancing manager determines that a ready queue of a prospective poaching processor element is empty of threads to indicate that the ready queue is an available ready queue.

3. The method of claim 1, wherein the load balancing manager determines that both a ready queue and a run queue of a prospective poaching processor element are empty of threads to indicate that the prospective poaching processor element is available.

4. The method of claim 1, wherein the moving step comprises moving, by the load balancing manager, threads of the process tree to multiple available poaching processor elements in parallel.

5. The method of claim 1, further comprising assigning, by the load balancing manager, another process tree to a particular home processor element.

6. The method of claim 1, further comprising:
   poaching, by the poaching processor element, one or more threads from the home processor element for a predetermined amount of time.

* * * * *